United States Patent [19]
Peer et al.

[11] 4,069,136
[45] Jan. 17, 1978

[54] COUNTERCURRENT HYDROCARBON CONVERSION WITH GRAVITY-FLOWING CATALYST PARTICLES

[75] Inventors: Roger L. Peer, La Grange; Irvin S. Fisch, Skokie, both of Ill.

[73] Assignee: UOP Inc., Des Plaines, Ill.

[21] Appl. No.: 735,707

[22] Filed: Oct. 26, 1976

[51] Int. Cl.² .................... C10G 35/12; C10G 39/00
[52] U.S. Cl. .................................. 208/65; 208/165; 208/169
[58] Field of Search ............... 208/64, 65, 165, 169

[56] References Cited
U.S. PATENT DOCUMENTS

| | | | |
|---|---|---|---|
| 2,285,727 | 6/1942 | Komarewsky | 208/64 |
| 2,689,821 | 9/1954 | Imhoff et al. | 208/64 |
| 3,483,740 | 10/1974 | Mitchell et al. | 208/64 |
| 3,516,924 | 6/1970 | Forbes | 208/65 |
| 3,706,536 | 12/1972 | Greenwood et al. | 208/175 |
| 3,882,015 | 5/1975 | Carson | 208/165 |

Primary Examiner—Herbert Levine
Attorney, Agent, or Firm—James R. Hoatson, Jr.; Robert W. Erickson; William H. Page, II

[57] ABSTRACT

A multiple-stage catalytic conversion system in which a hydrocarbon charge stock is countercurrently reacted in a plurality of catalytic reaction zones, in all of which the catalyst particles are downwardly movable via gravity-flow. The charge stock, in the absence of added, or recycled hydrogen, is reacted serially in the reaction zones in the order of increasing catalyst loading, the product ultimately being recovered from the effluent emanating from that reaction zone (1) into which fresh, or regenerated catalyst particles are introduced and, (2) which contains the greatest quantity of catalyst particles. Catalyst particles are transferred from one reaction zone to another in the order of decreasing catalyst loading, ultimately being withdrawn from the system through the reaction zone containing the least amount of catalyst particles.

10 Claims, 1 Drawing Figure

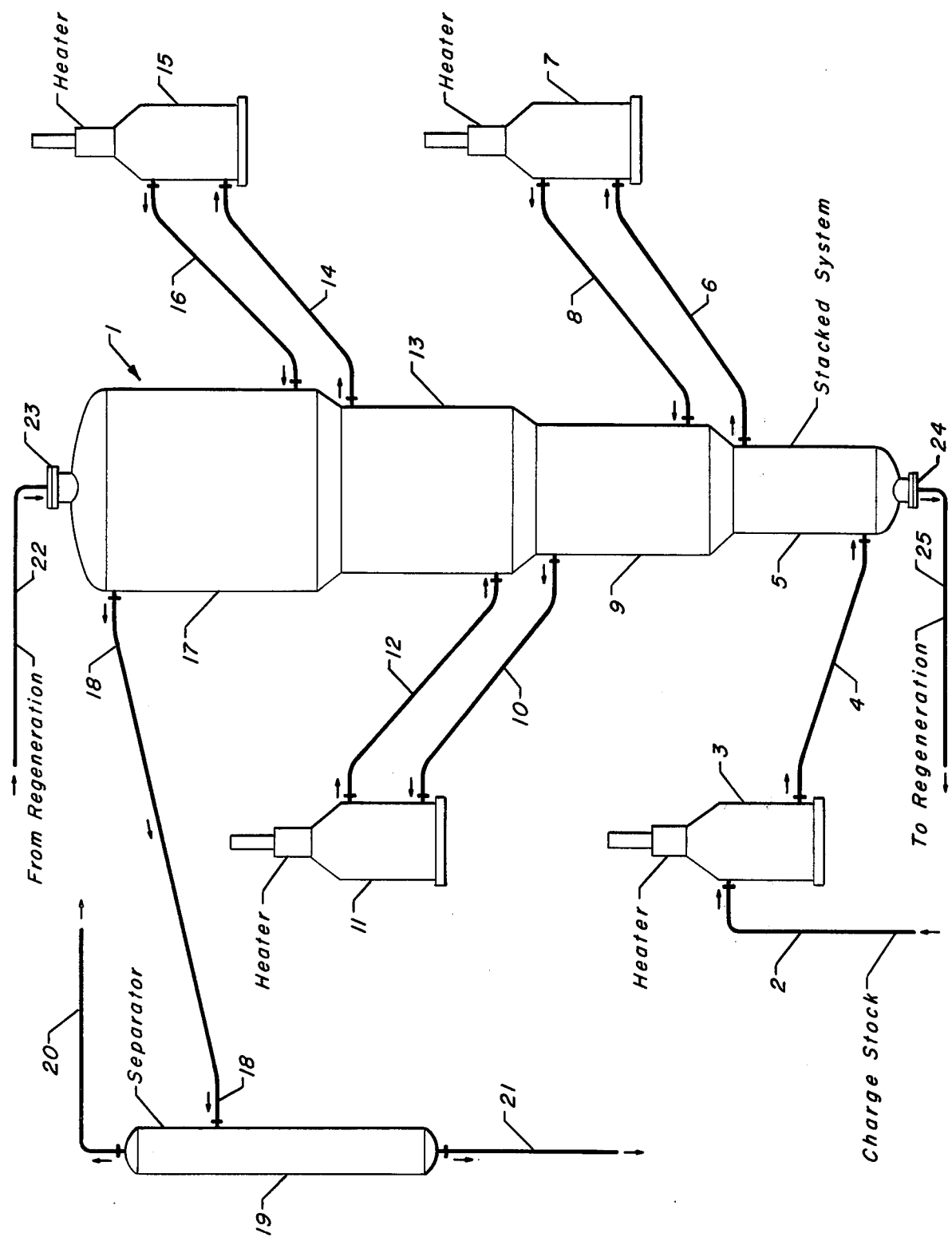

COUNTERCURRENT HYDROCARBON CONVERSION WITH GRAVITY-FLOWING CATALYST PARTICLES

APPLICABILITY OF INVENTION

The present invention is directed toward an improved technique for effecting the catalytic conversion of a hydrocarbonaceous reactant stream in a multiple-stage reaction system wherein (1) the reactant stream flows serially through the plurality of reaction zones and, (2) the catalyst particles are movable through each reaction via gravity-flow. More particularly, the described processing technique is adaptable for utilization in vapor-phase systems where (1) the conversion reactions are principally hydrogen-producing, or endothermic, (2) where fresh, or regenerated catalyst particles are introduced into one reaction zone, and are then transferred therefrom into at least one intermediate reaction zone and, (3) deactivated catalyst particles are withdrawn from the last reaction zone in the system for subsequent regeneration.

Various types of multiple-stage reaction systems have found widespread utilization throughout the petroleum and petrochemical industries for effecting multitudinous reactions, especially hydrocarbon conversion reactions. Such reactions are either exothermic, or endothermic, and both hydrogen-producing and hydrogen-consuming. Multiple-stage reaction systems are generally of two types: (1) existing in a side-by-side configuration with intermediate heating between the reaction zones, and wherein the reactant stream or mixture flows serially from one zone to another zone; and, (2) a stacked design wherein a single reaction chamber contains the multiple catalytic contact stages, and wherein intermediate heating is effected between stages. Such systems, as applied to petroleum refining, have been employed to effect numerous hydrocarbon conversion reactions including those which are prevalent in catalytic reforming, alkylation, ethylbenzene dehydrogenation to produce styrene, other dehydrogenation processes, etc. Our invention is specifically intended for utilization in endothermic, or hydrogen-producing hydrocarbon conversion processes, in the reaction zones of which the catalyst particles are downwardly movable via gravity-flow. It is contemplated, therefore, that the technique encompassed by our inventive concept is adaptable where (1) the plurality of reaction zones (at least three) exists in a side-by-side configuration and, (2) where the reaction zones exist as a vertical stack having a common axis. In the first configuration, the charge stock passes serially from one reaction zone into the next succeeding reaction zone. Fresh, or regenerated catalyst particles are introduced into the top of the first reaction zone and are transferred from the bottom thereof into the top of the next zone. Deactivated catalyst particles, intended for regeneration, are withdrawn from the bottom of the last reaction zone in the series. In the second configuration, being the stacked system, fresh, or regenerated catalyst particles are introduced into the uppermost reaction zone, flow downwardly therethrough, into and through subsequent, intermediate reaction zones, and deactivated catalyst particles are withdrawn from the system through the lowermost reaction zone. Our invention is also intended to be applied to those reaction systems wherein the catalyst is disposed as an annular bed and the flow of the reactant stream, serially from one zone to another reaction zone, is perpendicular, or radial to the movement of catalyst particles.

A radial-flow reaction system generally consists of tubular-form sections, of varying nominal cross sectional areas, vertically and coaxially-disposed to form the reaction vessel. Briefly, the system comprises a reaction chamber containing a coaxially-disposed catalyst retaining screen, having a nominal, internal cross sectional area less than said chamber, and a perforated centerpipe having a nominal, internal cross sectional area less than the catalyst retaining screen. The reactant stream is introduced in vapor-phase, into the annular-form space created between the inside wall of the chamber and the outside surface of the catalyst retaining screen. The latter forms an annular-form, catalyst holding zone with the outside surface of the perforated centerpipe; vaporous reactant flows laterally and radially through the screen and catalyst zone into the centerpipe and out of the reaction chamber. Although the tubular-form configuration of the various reactor components may take any suitable shape — i.e. triangular, square, oblong, diamond, etc. — many design, fabrication and technical considerations indicate the advantages of using components which are substantially circular in cross section.

Illustrative of a multiple-stage stacked reaction system, to which the present invention is particularly adaptable, is that shown in U.S. Pat. No. 3,706,536 (Cl. 23-288 G), issued Dec. 19, 1972. As indicated, the transfer of the gravity-flowing catalyst particles from one reaction zone to another, as well as the introduction of fresh catalyst particles and withdrawal of "spend" catalyst particles, is effected through the utilization of a plurality of catalyst transfer conduits. Briefly, our inventive concept encompasses a process wherein the fresh feed charge stock, without added, or recycled hydrogen, initially contacts gravity-flowing catalyst particles disposed as a stacked system, wherein catalyst flows through the zones in the order of decreasing catalyst volume. The reactant stream, however, flows completely countercurrently, in series, through the zones in the order of increasing catalyst volume. Thus, the reactant stream initially contacts the catalyst which has achieved the greatest level of coke deposition — i.e. has attained the highest degree of catalyst deactivation. The primary advantage stems from the elimination of the compressor otherwise required to recycle the hydrogen-rich vaporous phase to combine with the fresh feed charge stock prior to the first reaction zone. Another major benefit, as hereinafter set forth, resides in the concomitant reduction in the size of the catalyst regeneration facilities.

OBJECTS AND EMBODIMENTS

A principal object of our invention is to eliminate compressive recycle of hydrogen in a multiple-stage hydrogen-producing hydrocarbon conversion process. A corollary objective is to afford significant utilities savings, or energy, in hydrocarbon conversion processes wherein large quantities of hydrogen are otherwise normally circulated.

A specific object of the present invention is directed toward an improvement in the catalytic reforming of hydrocarbons in a multiple-stage reaction zone system through which catalyst particles are movable via gravity-flow. Another object is directed toward a reduction in the size of the regeneration facilities integrated into the multiple-stage reaction system. In one application of the present invention, the regeneration facilities also function with gravity-flowing catalyst particles. However, it is still another object of our invention to coordinate riser-regeneration, similar to that practiced in the well-known Fluid Catalytic Cracking process, with the gravity-flowing catalytic reaction system.

In one embodiment, therefore, our invention is directed toward a process for the catalytic reforming of a hydrocarbon charge stock in a multiple-stage reactor system in which (1) catalyst particles flow downwardly, via gravity, through each reaction zone in said system, (2) catalyst particles from one reaction zone are introduced into the next succeeding reaction zone, (3) deactivated catalyst particles are withdrawn from said system through the lower end of the last reaction zone and, (4) fresh, or regenerated catalyst particles are introduced into the upper end of the first reaction zone in said system, which process comprises the sequential steps of: (a) reacting said charge stock, in the absence of added hydrogen, in said last reaction zone, from which deactivated catalyst particles are withdrawn from said system, at catalytic reforming conditions; (b) further reacting the effluent from said last reaction zone in at least one intermediate reaction zone, at catalytic reforming conditions; (c) further reacting the effluent from said intermediate reaction zone in said first reaction zone, through which fresh, or regenerated catalyst particles are introduced into said system, at catalytic reforming conditions; and, (d) recovering a normally liquid, catalytically reformed product from the effluent withdrawn from said first reaction zone; said process being further characterized in that said first reaction zone contains the greater amount of catalyst particles and said last reaction zone contains the least amount of catalyst particles.

In a more specific embodiment, the invention herein described affords a multiple-stage hydrocarbon catalytic reforming process which comprises the steps of: (a) introducing fresh, or regenerated catalyst particles into the upper end of a first reaction zone, through which said particles are movable via gravity-flow, and transferring catalyst particles from the lower end of said first zone into the upper end of a second reaction zone, through which said particles are movable via gravity-flow, said second zone containing a lesser quantity of catalyst particles than said first reaction zone; (b) transferring catalyst particles from the lower end of said second reaction zone into the upper end of a third reaction zone, through which said particles are movable via gravity-flow, said third zone containing a lesser quantity of catalyst particles than said second reaction zone; (c) transferring catalyst particles from the lower end of said third reaction zone into the upper end of a fourth reaction zone, through which said particles are movable via gravity-flow, said fourth zone containing a lesser quantity of catalyst particles than said third reaction zone, and withdrawing deactivated catalyst particles from the lower end of said fourth reaction zone; (d) reacting a hydrocarbon charge stock, in the absence of added hydrogen, in said fourth reaction zone, at catalytic reforming conditions; (e) further reacting the resulting fourth reaction zone effluent in said third reaction zone, at catalytic reforming conditions; (f) further reacting the resulting third reaction zone effluent in said second reaction zone, at catalytic reforming conditions; (g) further reacting the resulting second reaction zone effluent in said first reaction zone, at catalytic reforming conditions; and, (h) recovering a normally liquid, catalytically reformed product from the resulting first reaction zone effluent.

These, as well as other objects and embodiments of our invention will become evident from the following, more detailed description of the present hydrocarbon conversion process. In one such other embodiment, where a stacked system consists of four reaction zones, the uppermost reaction zone contains about 35.0 to about 50.0% by volume of the total catalyst in the system, the first intermediate zone about 25.0 to about 35.0%, the second intermediate zone about 15.0 to about 25.0% and the lowermost reaction zone from about 5.0 to about 15.0%.

PRIOR ART

Candor compels recognition of the fact that various types of hydrocarbon conversion processes utilize multiple-stage reaction systems, either in side-by-side configuration, as a vertically-disposed stack, or a combination of a stacked system in side-by-side relation with one or more separate reaction zones. As applied to petroleum refining, such systems may be employed in a wide variety of hydrocarbon conversion reactions. While our inventive concept is adaptable to many conversion reactions and processes, through the reaction system of which the catalyst particles are movable via gravity-flow, the same will be additionally described in conjunction with the well known endothermic, or hydrogen-producing catalytic reforming process. Historically, the catalytic reforming process has been effected in a non-regenerative, fixed-bed system comprising a plurality of reaction zones in side-by-side relation. When the catalytic composite had become deactivated to the extent that continuous operation was no longer economically feasible, the entire unit was shut-down and the catalyst regenerated in situ. Of more recent vintage is the so-called "swing-bed" system in which an extra reactor is substituted for one which is due to be placed off-stream for regeneration purposes. Still more recently, multiple-stage reactor systems have been provided in which the catalyst particles flow, via gravity, through each reaction zone. In a "stacked" system, the catalyst particles also flow downwardly, via gravity, from one catalyst-containing zone to another, and ultimately transfer to a suitable regeneration system which can also function with a downwardly moving bed of catalyst particles. We also contemplate employing regeneration facilities which are patterned after those utilized in the well known Fluid Catalytic Cracking process. The deactivated catalyst particles are transferred into an ebullient, constant-temperature bed. Net upward combustion air flow ultimately reaches lift velocity, and the flue gas lifts the catalyst into a disengaging vessel from which the regenerated catalyst particles are transferred into the first reaction zone. With respect to the stacked reaction system, the catalyst particles are maintained from one section to another in a manner such that the flow of catalyst is continuous, at frequent intervals, or at extended intervals, with the movement being controlled by the quantity of catalyst withdrawn from the last of the series of individual reaction zones.

U.S. Pat. No. 3,470,090 (Cl. 208-138) issued Sept. 30, 1969, illustrates a multiple-stage side-by-side reaction system with intermediate heating of the reactant stream which flows serially through the individual reaction zones. Catalyst withdrawn from any one of the reaction zones is transported to suitable regeneration facilities. A system of this type can be modified to the extent that the catalyst particles withdrawn from a given reaction zone are transported to the next succeeding reaction zone, while that catalyst withdrawn from the last reaction zone may be transported to suitable regeneration facilities. The necessary modifications can be made in the manner disclosed in U.S. Pat. No. 3,839,197 (Cl. 208-174), issued Oct. 1, 1974, involving an interreactor catalyst transport method. Catalyst transfer from the last reaction zone in the plurality to the top of the catalyst regeneration zone is possible through the technique illustrated in U.S. Pat. No. 3,839,196 (Cl. 208-174), issued Oct. 1, 1974.

A stacked reaction configuration is shown in U.S. Pat. No. 3,647,680 (Cl. 208-65), issued Mar. 7, 1972, as a two-stage system having an integrated regeneration facility which receives that catalyst withdrawn from the bottom reaction zone. Similar stacked configurations are illustrated in U.S. Pat. No. 3,692,496 (Cl. 23-288 G), issued Sept. 19, 1972 and U.S. Pat. No. 3,725,249 (Cl. 208-139), issued Apr. 3, 1973.

As hereinbefore stated, general details of a three reaction zone, stacked system are present in U.S. Pat. No. 3,706,536 (Cl. 23-288 G), issued Dec. 19, 1972, and illustrates one type of multiple-stage system to which the present inventive concept is applicable. It should be noted, as generally practiced in a catalytic reforming unit, that each succeeding reaction zone contains a greater volume of catalyst. U.S. Pat. No. 3,864,240 (Cl. 208-64), issued Feb. 4, 1975, is illustrative of the integration of a reaction system having gravity-flowing catalyst particles with a fixed-bed system. As stated in this reference, one of the advantages resides in revamping an existing three reaction zone, fixed-bed system to conform to the integrated system. In such a modification, it is suggested that a second compressor be added to permit the split-flow of hydrogen-rich recycle gas as also described in U.S. Pat. No. 3,516,924 (Cl. 208-75), issued June 23, 1970.

U.S. Pat. No. 3,725,248 (Cl. 208-138), issued Apr. 3, 1973 illustrates a multiple-stage system in side-by-side configuration with gravity-flowing catalyst particles being transported from the bottom of one reaction zone to the top of the next succeeding reaction zone, those catalyst particles being removed from the last reaction zone being transferred to suitable regeneration facilities. As illustrated, the flow of the fresh feed charge stock is countercurrent to the flow of catalyst particles from one zone to the top of the next succeeding reaction zone. Thus, the fresh feed initially contacts those catalyst particles which have experienced the greatest degree of deactivation. However, there is no recognition of the "no recycle hydrogen" concept forming the foundation of the present invention. As stated, conventional reforming entails admixing a considerable excess of hydrogen with the hydrocarbon charge stock — e.g. up to about a mole ratio of hydrogen/hydrocarbon of 10.0:1.0.

These illustrations are believed to be fairly representative of the art which has developed in the multiple-stage conversion systems wherein catalyst particles are movable through each reaction zone via gravity-flow. It is noteworthy that there is no recognition of the present inventive concept of no recycle hydrogen to the first reaction zone, into which the fresh feed charge stock is initially introduced. Furthermore, the reaction system configuration of the present invention is not disclosed.

SUMMARY OF INVENTION

As hereinbefore set forth, the process encompassed by our inventive concept is suitable for use in hydrocarbon conversion systems characterized as multiple-stage and in which catalytic particles are movable, via gravity-flow, in each reaction zone. Furthermore, the present invention is principally intended for utilization in systems where the principal reactions are endothermic, or hydrogen-producing, and are effected in vapor-phase operation. Although the following discussion is specifically directed toward catalytic reforming of naphtha boiling range fractions, there is no intent to so limit the present invention. Catalytic reforming, as well as many other processes, has experienced several phases of development currently terminating in a system in which the catalyst beds assume the form of a descending column in one or more reaction vessels. Typically, the catalysts are utilized in spherical form having a nominal diameter ranging from about 1/32-inch to about 5/32-inch in order to offer free-flow characteristics which will neither bridge, nor block the descending column, or columns of catalyst within the overall system. In one such multiple-stage system, the reaction chambers are vertically stacked, and a plurality (generally from six to 16) of relatively small diameter conduits are employed to transfer catalyst particles from one reaction zone to the next lower reaction zone (via gravity-flow) and ultimately as withdrawn catalyst from the last reaction zone. The latter are usually transported to the top of a catalyst regeneration facility, also functioning with a descending column of catalyst particles; regenerated catalyst particles are transported to the top of the upper reaction zone of the stack. In order to facilitate and enhance gravity-flow within each reaction vessel, as well as from one to another, it is particularly important that the catalyst particles have a relatively small nominal diameter, and one which is preferably less than about 5/32-inch. In a conversion system having the individual reaction zones in side-by-side relationship, catalyst transport vessels (of the type shown in U.S. Pat. No. 3,839,197) are employed in transferring the catalyst particles from the bottom of one zone to the top of the succeeding zone, and from the last reaction zone to the top of the regeneration facility (U.S. Pat. No. 3,839,196).

Catalytic reforming of naphtha boiling range hydrocarbons, a vapor-phase operation, is effected at conversion conditions which include catalyst bed temperatures in the range of about 700° to about 1020° F.; judicious and cautious techniques generally dictate that catalyst temperatures not substantially exceed a level of about 1020° F. Other conditions include a pressure from about 50 psig. to about 1000 psig., a liquid hourly space velocity (defined as volumes of fresh charge stock per hour, per volume of total catalyst particles) of from 0.2 to about 10.0 and, prior to the present invention, a hydrogen to hydrocarbon mole ratio from about 1.0:1.0 to about 10.0:1.0, with respect to the initial reaction zone. As those possessing the requisite skill in the refining art are aware, the described continuous regenerative reforming system offers numerous advantages when compared to the prior fixed-bed systems. Among these is the capability of efficient operation at lower pressures — e.g. 50 psig. to about 150 psig. — and higher liquid hourly space velocities — e.g. 3.0 to about 8.0. Further, as a result of continuous catalyst regeneration, higher consistent inlet catalyst bed temperatures can be maintained — e.g. 950° to about 1010° F. There also exists a corresponding increase in both hydrogen production and hydrogen purity in the vaporous phase recovered from the product separator.

Catalytic reforming reactions are multifarious, and include the dehydrogenation of naphthenes to aromatics, the dehydrocyclization of paraffins to aromatics, the hydrocracking of long-chain paraffins into lower-boiling normally-liquid material and, to a certain extent, the isomerization of paraffins. These reactions are effected through the use of one or more Group VIII noble metals (e.g. platinum, iridium, rhodium) combined with a halogen (e.g. chlorine and/or fluorine) and a porous carrier material such as alumina. Recent investigations have indicated that more advantageous results are attainable and enjoyed through the cojoint use of a catalytic modifier; these are generally selected from the group of cobalt, nickel, gallium, germanium, tin, rhenium, vanadium and mixtures thereof. Regardless of the particular selected catalytic composite, the ability to attain the advantages over the common fixed-bed systems is greatly dependent upon achieving substantially uniform catalyst flow downwardly through the system.

Catalytic reforming, as currently conventionally practiced, is a well known process which has been thoroughly described in the literature, having been a commercially important tool of the petroleum refining industry for more than a quarter of a century. One of the many items gleaned from the vast amount of reforming experience and resulting knowledge is the soundness of utilizing multiple stages, each of which contains a different quantity of catalyst, expressed generally as volume percent. The reactant stream, hydrogen and the hydrocarbon feed, flows serially through the reaction zones in order of increasing catalyst volume with, of course, interstage heating. In a three reaction zone system, typical catalyst loadings are: first, 10.0 to about 30.0%; second, from 20.0 to about 40.0%; and, third, from about 40.0 to about 60.0%. With respect to a four reaction zone system, suitable catalyst loading would be: first, 5.0 to about 15.0%; second, 15.0 to about 25.0%; third, 25.0 to about 35.0%; and, fourth, 35.0 to about 50.0%. Unequal catalyst distribution, increasing in the serial direction of reactant stream flow, facilitates and enhances the distribution of the reactions and the overall heat of reaction. Current operating techniques involve separating the total effluent from the last reaction zone, in a so-called high-pressure separator, at a temperature of about 60° to about 140° F., to provide the normally liquid product stream and a hydrogen-rich vaporous phase. A portion of the latter is combined with the fresh charge stock as recycle hydrogen, while the remainder is vented from the process.

We have found that the current improved catalytic composites coupled with (1) a reaction zone system in which catalyst particles are movable via gravity-flow and, (2) continuous catalyst regeneration make it possible to effect catalytic reforming without a hydrogen-rich recycle gas stream. This permits a significant reduction in the capital expenditure of a commercial unit by completely eliminating the recycle gas compressor. When there is no recycled hydrogen, the hydrogen/hydrocarbon mole ratio is obviously "zero" at the inlet of the catalyst bed in the first reaction zone which the charge stock "sees." In catalytic reforming, most of the naphthenes are converted to aromatics in this initial reactor; this produces a large amount of hydrogen. In fact, as much as 50.0% of the overall hydrogen production from the entire catalytic reforming process stems from the reactions effected in the first reactor. This hydrogen yield provides an increasing hydrogen/hydrocarbon ratio in the second reactor and subsequent reactors. This means that only reactor number one functions at zero hydrogen/hydrocarbon ratio, and only at the inlet thereto. Therefore, the formation of coke will be higher in this reactor than in any of the subsequent reactors. As hereinbefore stated, considering a four-reactor system, the reactant flow is serially 1-2-3-4; in a stacked system, the number one reaction zone is considered to be at the top. Also, catalyst distribution is generally unequal and such that the catalyst volume increases from one reactor to the next succeeding reactor; that is, the number one zone contains the least amount of catalyst particles, while the last, or fourth reaction zone contains more catalyst than any of the others.

The generally accepted and most common method of operating a gravity-flowing catalytic reforming system, with integral continuous catalyst regeneration, is to stack the reaction zones such that catalyst particles also flow from one reaction zone into the next succeeding lower reaction zone. With this type of arrangement, catalyst circulation rate is the same through all the reactors constituting the stack. Where no recycle gas compressor is provided, this becomes a relatively poor arrangement since the first (uppermost) reaction zone requires a higher catalyst circulation rate due to its high coke deposition. This reactor would then dictate the catalyst circulation rate for all the reactors in the stack. Furthermore, there is the additional disadvantage of highly coked, deactivated catalyst flowing into the second and subsequent reactors where maximum activity is required to effect paraffin isomerization, paraffin dehydrocyclization and hydrocracking.

Our invention, as directed to a multiple-stage, stacked system wherein catalyst particles flow downwardly via gravity through each reaction zone, and from one zone into the next succeeding zone, is to reverse the reaction zones such that the uppermost zone contains the greater quantity of catalyst particles and the lowermost zone the least amount of catalyst particles. Thus, where the system consists of four individual reaction zones, the first zone, into which fresh, or regenerated catalyst particles are introduced, will contain from about 35.0% to about 50.0%, by volume of the total catalyst. The first intermediate zone will contain from about 25.0% to about 35.0%, while the second intermediate zone about 15.0 to about 25.0%. The last reaction zone, from which the deactivated catalyst particles are withdrawn from the system, will contain the least amount of catalyst, from about 5.0 to about 15.0%. The reactant stream flows countercurrently to the descending column of catalyst particles, with the fresh charge stock initially contacting the catalyst in the last reaction zone. This means that the charge stock first contacts that catalyst having the highest degree of deactivation. Conversely, the "last" catalyst which the reactant stream "sees" has experienced little, or no deactivation. In addition to the advantages attendant the elimination of the recycle gas compressor, a principal benefit arises from an overall reduction in coke make. Through the elimination of the compressor, considering a unit having a daily charge stock capacity of about 20,000 barrels, there is an initial capital savings of about 1 million dollars. Additionally, the savings in energy, about 4,000 BHP, converts to about $600,000 per year of operation.

Coke deposition occurs at a considerably reduced rate on a catalyst that has already been partially deactivated by coke, than it does on the freshly regenerated catalyst particles entering the system via the top reaction zone. In view of the fact that there is an overall reduction in the amount of coke make, the size and operating costs of the attendant regeneration facilities is also reduced. Another advantage is that less catalyst circulation is required because the catalyst leaving the last reactor can have a coke content as high as about 20.0%, by weight, instead of the usual 2.0 to about 5.0%. High activity is not required in this reactor since the main reaction is the conversion of naphthenes into aromatic hydrocarbons.

BRIEF DESCRIPTION OF DRAWING

The further description of the present invention, and the method of operation, will be made in conjunction with the accompanying drawing. It is understood that the drawing is presented solely for the purposes of illustration, and the same is not intended to be construed as limiting upon the scope and spirit of our invention as defined by the appended claims. Therefore, miscellaneous appurtenances, not required for a complete understanding of the inventive concept, have been eliminated, or reduced in number. Such items are well within the purview of one possessing the requisite skill in the appropriate art. The illustrated embodiment is presented as a simplified schematic flow diagram of a four reaction zone process as stacked system 1. As shown, reaction zone 17 contains the greatest quantity of catalyst particles, while reaction zone 5 contains the least.

DETAILED DESCRIPTION OF DRAWING

With respect to the volumetric distribution of catalyst particles, uppermost reaction zone 17 contains about 50.0% by volume zone 13 about 25.0%, zone 9 about 15.0% and zone 5 about 10.0%. Fresh, or regenerated catalyst particles are introduced into the system through conduit 22 and catalyst inlet port 23. These flow downwardly, via gravity, through reaction zone 17, and into zone 13. Likewise, the catalyst particles flow through reaction zone 13, and therefrom into reaction zone 9, from which they flow into lowermost reaction zone 5. The deactivated catalyst particles are withdrawn from the system through catalyst outlet port 24 and conduit 25. These are then transported to suitable regeneration facilities.

Fresh charge stock is introduced into the process via line 2 and, after it has been heat-exchanged against another process stream of elevated temperature, passes into charge heater 3. The thus-heated feed, at the temperature desired at the inlet to the catalyst bed in reaction zone 5, is introduced thereto via line 4. The effluent from reaction zone 5, at a lower temperature due to the endothermicity of the reactions, is introduced by way of line 6 into inter-heater 7. Approximately 80.0 to about 90.0% of the naphthenes are dehydrogenated to aromatics, with the accompanying production of sufficient hydrogen to effect efficiently the reactions in the subsequent reaction zones.

The heated effluent from zone 5 is passed through conduit 8 into the next intermediate zone 9; likewise, the effluent therefrom, in line 10, is increased in temperature in heater 11, and introduced through line 12 into the second intermediate zone 13. Effluent from zone 13 is introduced, via line 14, into inter-heater 15, and the heated effluent passes through line 16 into the uppermost reaction zone 17. The final, total product effluent passes through line 18 and, following its use as a heat-exchange medium, into a suitable condenser (not illustrated) wherein the temperature is lowered to a level in the range of about 60° to about 140° F. The condensed material is then introduced into a separation vessel 19, from which the normally liquid product is recovered in line 21. A hydrogen-rich vapor phase, containing some light paraffinic hydrocarbons and a minor quantity of butane and pentane, is removed through line 20 and transported thereby into suitable hydrogen concentration facilities. The recovered hydrogen is extremely well-suited for use in various hydrogen-consuming processes.

Through the implementation of the present invention, as above described, the catalytic reforming of a hydrocarbon charge stock is effected in a multiple-stage system, in which catalyst particles flow downwardly, via gravity, through each reaction zone in the system, without the recycling of a portion of the hydrogen-rich vaporous phase separated from the desired normally liquid product effluent, or without the addition of hydrogen from some external source. As will be recognized by those skilled in the art, there is afforded a significant capital savings as a result of the elimination of the recycle gas compressor, in addition to a concomitant savings in operational utility requirements.

We claim as our invention:

1. A process for the catalytic reforming of a naphtha charge stock with a catalyst comprising a Group VIII noble metal on an alumina carrier to produce a gasoline of higher octane number in a multiple-stage reactor system in which (1) catalyst particles flow downwardly, via gravity, through each reaction zone in said system, (2) catalyst particles from one reaction zone are introduced into the next succeeding reaction zone, (3) deactivated catalyst particles are withdrawn from said system through the lower end of the last reaction zone and, (4) fresh, or regenerated catalyst particles are introduced into the upper end of the first reaction zone in said system, which process comprises the sequential steps of:

a. reacting said charge stock, in the absence of added or recycled hydrogen, in said last reaction zone, from which deactivated catalyst particles are withdrawn from said system, at catalytic reforming conditions;

b. further reacting the effluent from said last reaction zone in at least one intermediate reaction zone, at catalytic reforming conditions;

c. further reacting the effluent from said intermediate reaction zone in said first reaction zone, through which fresh, or regenerated catalyst particles are introduced into said system, at catalytic reforming conditions; and, d. recovering a normally liquid, catalytically-reformed product from the effluent withdrawn from said first reaction zone;

said process being further characterized in that said first reaction zone contains the greater amount of catalyst particles and said last reaction zone contains the least amount of catalyst particles.

2. The process of claim 1 further characterized in that said multiple-stage system comprises at least three reaction zones.

3. The process of claim 2 further characterized in that said first reaction zone contains from about 40.0 to about 60.0%, by volume, of the total catalyst in said system; said intermediate reaction zone about 20.0 to about 40.0%; and, said last reaction zone from about 10.0 to about 30.0%.

4. The process of claim 1 further characterized in that the reaction zones in said system are vertically-stacked, along a common vertical axis, and the catalyst particles flow via gravity from one reaction zone to the next succeeding reaction zone.

5. The process of claim 1 further characterized in that the reaction zones in said system are in side-by-side configuration, and the catalyst particles are transported from the lower end of one reaction zone to the upper end of the next succeeding reaction zone.

6. The process of claim 1 further characterized in that said multiple-stage system contains four reaction zones.

7. A multiple-stage catalytic reforming of a naphtha charge stock with a catalyst comprising a Group VIII noble metal on an alumina carrier to produce a gasoline of higher octane number than said naphtha which comprises the steps of:
   a. introducing fresh, or regenerated catalyst particles into the upper end of a first reaction zone, through which said particles are movable via gravity-flow, and transferring catalyst particles from the lower end of said first zone into the upper end of a second reaction zone, through which said particles are movable via gravity-flow, said second zone containing a lesser quantity of catalyst particles than said first reaction zone;
   b. transferring catalyst particles from the lower end of said second reaction zone into the upper end of a third reaction zone, through which said particles are movable via gravity-flow, said third zone containing a lesser quantity of catalyst particles than said second reaction zone;
   c. transferring catalyst particles from the lower end of said third reaction zone into the upper end of a fourth reaction zone, through which said particles are movable via gravity-flow, said fourth zone containing a lesser quantity of catalyst particles than said third reaction zone, and withdrawing deactivated catalyst particles from the lower end of said fourth reaction zone;
   d. reacting a hydrocarbon charge stock in the absence of added or recycled hydrogen, in said fourth reaction zone, at catalytic reforming conditions;
   e. further reacting the resulting fourth reaction zone effluent in said third reaction zone, at catalytic reforming conditions;
   f. further reacting the resulting third reaction zone effluent in said second reaction zone, at catalytic reforming conditions;
   g. further reacting the resulting second reaction zone effluent in said first reaction zone, at catalytic reforming conditions; and,
   h. recovering a normally liquid, catalytically-reformed product from the resulting first reaction zone effluent.

8. The process of claim 7 further characterized in that said four reaction zones are vertically-stacked, along a common vertical axis, and the catalyst particles flow via gravity from one reaction zone to the next succeeding reaction zone.

9. The process of claim 7 further characterized in that said four reaction zones are in side-by-side configuration, and the catalyst particles are transported from the lower end of one reaction zone to the upper end of the next succeeding reaction zone.

10. The process of claim 7 further characterized in that said first reaction zone contains about 35.0 to about 50.0% by volume of the total catalyst, said second reaction zone from about 25.0 to about 35.0%, said third reaction zone from about 15.0 to about 25.0% and said fourth reaction zone from about 5.0 to about 15.0%.

* * * * *